Sept. 14, 1943.                C. H. NELSON                    2,329,412
                    LIQUID LEVEL MEASURING INSTRUMENT
                Filed March 25, 1940          5 Sheets—Sheet 1

CARY HOLLIS NELSON
INVENTOR

BY
ATTORNEY

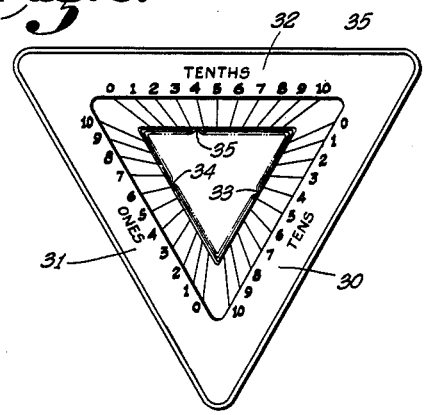
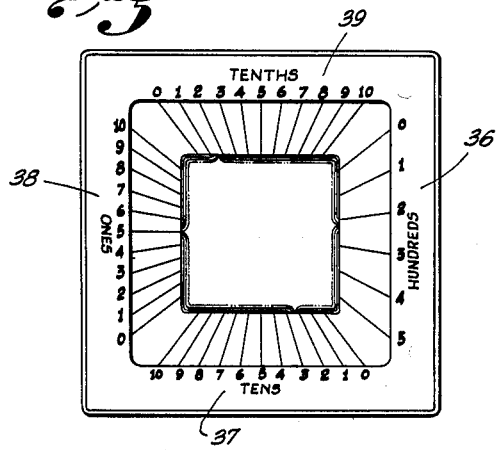
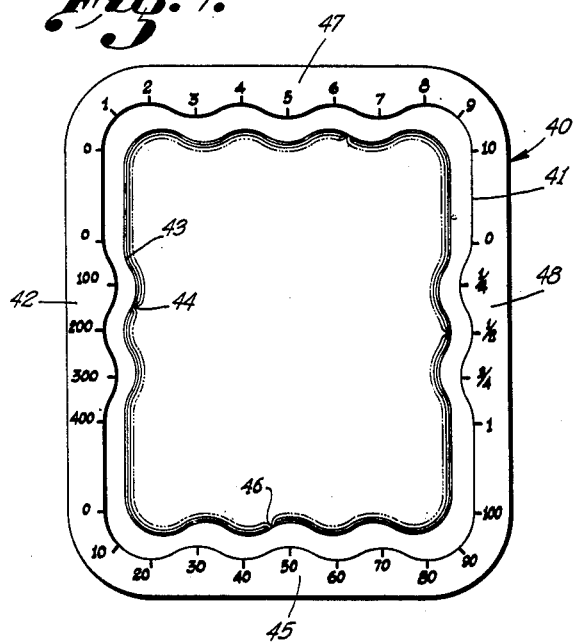
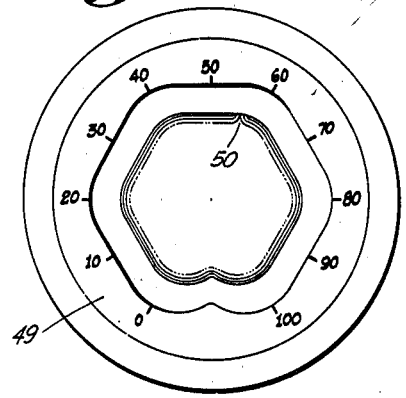

Sept. 14, 1943.                     C. H. NELSON                        2,329,412
                            LIQUID LEVEL MEASURING INSTRUMENT
                            Filed March 25, 1940           5 Sheets-Sheet 3

CARY HOLLIS NELSON
INVENTOR
BY
ATTORNEY

Sept. 14, 1943. C. H. NELSON 2,329,412
LIQUID LEVEL MEASURING INSTRUMENT
Filed March 25, 1940 5 Sheets-Sheet 4

CARY HOLLIS NELSON
INVENTOR

BY
ATTORNEY

Sept. 14, 1943.   C. H. NELSON   2,329,412
LIQUID LEVEL MEASURING INSTRUMENT
Filed March 25, 1940   5 Sheets-Sheet 5
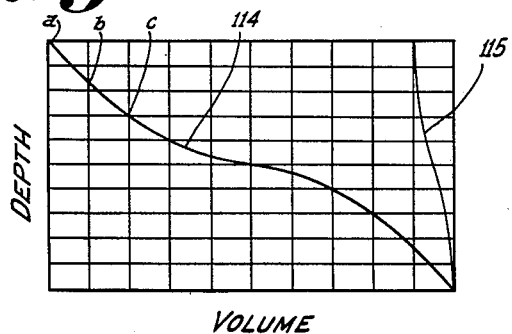
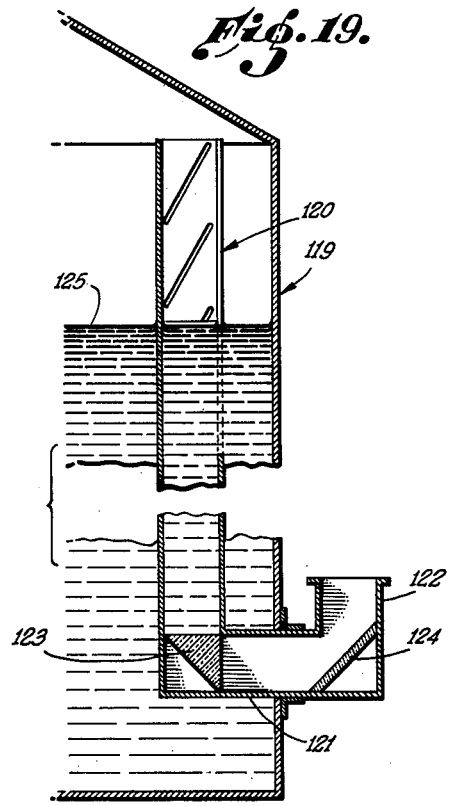
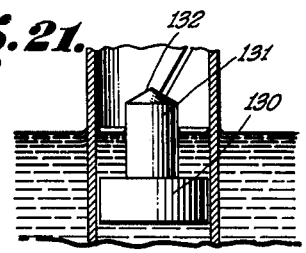
CARY HOLLIS NELSON
INVENTOR
BY
ATTORNEY Patented Sept. 14, 1943

2,329,412

UNITED STATES PATENT OFFICE 2,329,412

LIQUID LEVEL MEASURING INSTRUMENT

Cary Hollis Nelson, Pasadena, Calif.

Application March 25, 1940, Serial No. 325,810

10 Claims. (Cl. 73—290)

This invention pertains to improved and novel devices for gauging whereby the depth, amount, quantity, volume or rate of flow of liquids may be visually observed. The forms of devices embraced by this invention employ a new mode of operation which permits accurate determination of the volume, depth, amount, capacity, quantity or rate of flow of various liquids without the employment of moving elements or parts or other complicated devices.

Heretofore the gauging of liquids has been accomplished by a large number of different methods and devices. The volume of a liquid in a tank has been previously determined, for example, by means of floats, by means of pressure gauges which are responsive to hydrostatic head of the liquid within a tank or container, and by the old-fashioned measuring stick which was inserted into the tank and then withdrawn for the purpose of reading the height of the liquid within the tank. None of these methods is satisfactory and all of them are either inaccurate or involve the use of devices which become inaccurate in time and are subject to breakdown.

The present invention is based upon the discovery that when the meniscus of the surface of a liquid is interrupted along a predetermined path inclined to the surface of the liquid, the lateral position of the interruption in said meniscus may be observed and the elevation of the surface of the body of liquid may be thus readily determined. The meniscus may be interrupted by the use of a member having a slot in its surface, the slot being inclined to the vertical or to the surface of the liquid, said slot being adapted to form an observable interruption in the meniscus of the liquid surface. When the position of such interruption laterally is observed, the depth, volume, amount, quantity or rate of flow of the liquid or other substance may be determined. It will be evident that by measuring the surface level of a stream of water flowing through a culvert of known size, the rate of flow can be readily determined. Reading of such a gauge is facilitated by the provision of a suitable scale or index, said scale bearing a predetermined relationship to the inclination of the slot. The scale may be calibrated in any suitable manner as, for example, in per cent, in linear units, in volumetric units, etc. In one of its usual forms the device comprises a relatively stiff member having an inclined slot therein and a scale associated with one end of the member. When such member is introduced into a liquid, the position of the liquid surface at its point of entry into the slot may be readily observed and correlated with the scale. It has been discovered that irrespective of the characteristics of the liquid the point at which said liquid enters the slot will produce a curvature of the surface of the liquid at or adjacent such point of entry, which curvature of the surface is readily observable either from above or below the liquid surface. In this manner, the precise point of entry may then be read upon the scale and the depth, amount, quantity, volume or rate of flow of a liquid may be visually observed.

It is an object of the present invention, therefore, to provide a device for accurately measuring the depth, amount, quantity, volume or rate of flow of freely flowing materials.

A further object is to provide simple means characterized by freedom from moving elements or parts which may be employed in the determination of depth, amount, quantity, volume or rate of flow of liquids.

A still further object is to disclose and provide means whereby the volume or amount of liquid within a container of irregular shape or contour may be visually observed and determined upon a uniformly graduated gauge.

These and other objects of the invention will become apparent to those skilled in the art from a contemplation of the description given hereinafter. In order to facilitate understanding and by way of example, reference will be had to the appended drawings, in which:

Fig. 5 is a top perspective view of another form of gauge.

Fig. 6 is a top perspective view of a gauge provided with four scales.

Fig. 7 is a top perspective view of a modified form of gauge provided with four scales.

Fig. 8 is a top perspective view of a still further modification.

Figure 17:
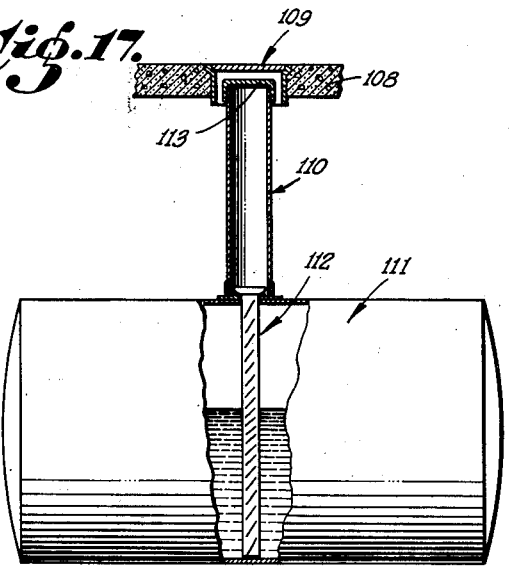
Fig. 17 illustrates an arrangement for use with horizontal underground tanks.

Fig. 18 diagrammatically illustrates the expanded form of slots for use in a gauge of the type illustrated in Fig. 17.

Fig. 19 is a vertical section of a gauge installed in a tank, with means for reading the gauge from the bottom.

Figs. 20 and 21 comprise plan and sectional views through an accessory within a gauge of this invention.

Figure 1:
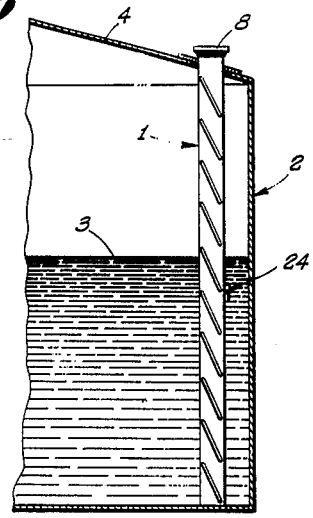
Fig. 1 is a vertical section through a tank provided with a gauge embodying one form of this invention.
Figure 2:
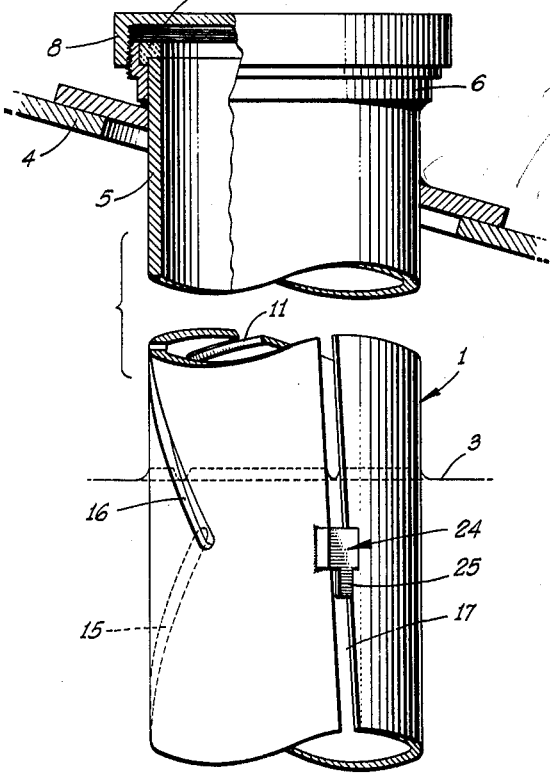
Fig. 2 is an enlarged side elevation of a gauge such as is shown in Fig. 1.

One of the simplest forms of the device in use is indicated in Fig. 1, wherein the device, generally indicated at 1, is positioned within a tank 2 having a body of liquid whose surface level is indicated at 3. The gauge extends through the roof 4 of the tank and as shown in Fig. 2, the body portion of the device comprises a pipe 5 having a collar 6 at its upper end, retaining a scale ring 7. When not being used, the device is covered with a screw cap 8.

Figure 3:
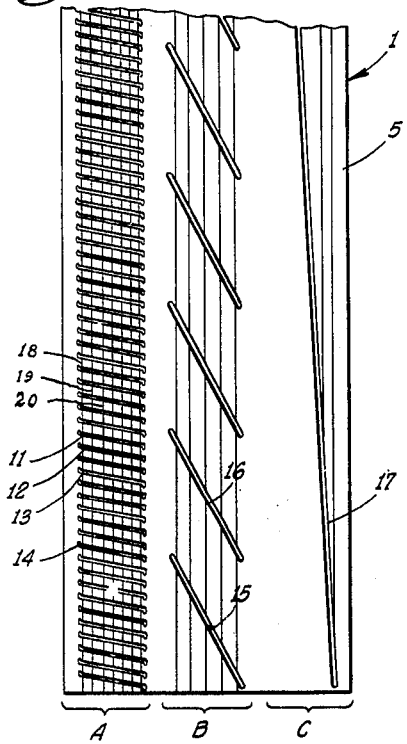
Fig. 3 is a portion of the gauge in developed or extended form.

The body portion of the device in extended form is indicated in Fig. 3 and it is to be noted that it comprises three longitudinally extending adjacent portions A, B and C. Each of the portions A, B and C is provided with inclined slots. The slots have predetermined inclinations to the vertical or to the surface of the liquid 3 within the tank 2.

Generally stated, it may be said that slots formed in the area A are adapted to read in tens; slots in the area B are adapted to indicate hundreds; and slots in the area C are adapted to read in thousands. It is to be understood, however, that in a three scale device such as is being described, the scales may be any desired multiple of each other; for example, they can be units, tens and hundreds, or the largest scale may represent units whereas the other two may represent fractions.

As shown in Fig. 3, inclined slots 11, 12, 13, 14 are formed in the longitudinally extending area A whereas slots 15, 16, etc., are formed in the longitudinally extending area B. The slots 15 and 16 are at a greater inclination than the slots 11 to 14. If the slots 11 to 14 are to represent tens whereas the slot 16 is to represent hundreds, then ten of the slots 11 to 14 should occupy a length of the member 5 equivalent to the length occupied by a single slot 16. The slot 17 may then represent thousands and its inclination is much greater than the inclination of the slots 15, 16, etc., so that a total of ten slots 15, 16, etc., occupy the length of the longitudinally extending area C through which the slot 17 extends.

The term "slot" is used herein in a generic sense, the word "groove" being understood to specifically refer to a species of slot. In other words, the slots 11, 15 and 17 carried by the member 5 may either extend completely through such member or they may be formed in one face only of the member.

By again referring to Fig. 2, the relative positions of the various slots are distinctly shown. This drawing shows the slot 17, the slot 16, and a portion only of slot 11. The liquid level is indicated at 3 and it will be noted that the meniscus of the liquid is interrupted by the slots.

Figure 4:
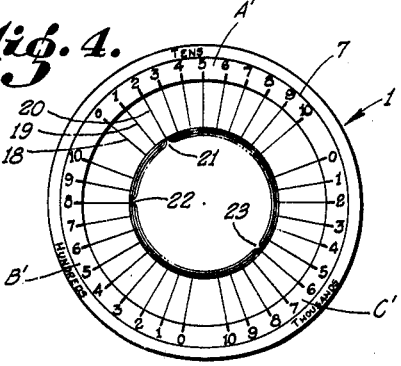
Fig. 4 is a top perspective view of the gauge, this view indicating the appearance of the gauge when a reading is taken.

The plan perspective view of the device in action is indicated in Fig. 4. It will be noted that the scale member 7 carries a tens scale at A', a hundreds scale at B', and a thousands scale at C'. Each of the scales carries numbers from zero to ten. The inner face of the member 5 may be provided with fine lines, minute grooves or beads parallel to the longitudinal axis of the member 5, as indicated by the lines 18, 19, 20, etc.

When the device is in position within the tank as indicated in Fig. 1, and the top or cover 8 is removed, a person may read the precise height or level of the liquid within the tank by looking down the device 1 or down the member 5. As shown in Fig. 4, it will be seen that the meniscus is interrupted at three points which are indicated at 21, 22 and 23. The interruption will assume the form of a bright point of light since the light entering the tubular member 5 will be reflected strongly at the point where the meniscus is broken by reason of the entry of the liquid surface into the slot. It will be evident, therefore, that the point 21 is opposite 2 on the tens scale A', the point 22 is between 8 and 9 on the hundreds scale B' and the point 23 is between 5 and 6 of the thousands scale C'. This immediately causes the observer to note that the reading of the gauge is 5820. This number may refer to gallons or barrels or other unit, depending upon the calibration of the device.

At this point, attention may be called to the fact that the device 1 may be strengthened considerable by bridging the longer slots, such as the slot 17, with a suitable bridging or reinforcing member. One such bridge is shown in Fig. 2 at 24 and may comprise a U-shaped clip attached to the member 5 on opposite sides of the slot 17. The arms of the U should be sufficiently long so that the body of the clip 24 is spaced from the slot 17. In order to prevent bubbles or droplets of liquid from being retained within the clip and thereby interfere with the reading of the gauge, it may be desirable to provide a downwardly extending tail piece 25. A plurality of these clips 24 may be carried by the device along the length of the slot 17, thereby materially adding to its strength and rigidity.

Figs. 5 and 6 show modified forms of the device. Both of these views are perspective plan views of the device while it is extending into a liquid. The device shown in Fig. 5 is triangular in horizontal section and the upper end of the device is provided with three scales, namely, a scale 30 reading in tens, a scale 31 reading in ones or units, and a scale 32 reading in tenths. The three spots of light which distinguish the interruptions of the meniscus determined by the inclination of the slots or grooves formed in the body of the device and the intersection of the liquid surface with such slots, are indicated at 33, 34 and 35 respectively. It will be noticed that the device illustrated in Fig. 5 reads 46.35.

A device having a square section is shown in Fig. 6, this device having a hundreds scale at 36, a tens scale at 37, a unit scale at 38, and a tenths scale at 39. As shown in Fig. 6, the device reads 225.15.

Instead of employing the beads, grooves, enameled lines or other indicia 18, 19, 20 referred to hereinabove with respect to Fig. 4 and also shown in Figs. 5 and 6, the eye may be guided down the tube or tubes by forming corrugations in the member having the meniscus-interrupting slots. Devices of this character are exemplified in Figs. 7 and 8. A device of substantially square horizontal section is shown in Fig. 7. The dial face is indicated at 40, the inner edge thereof being indicated at 41. The inner surface of the device throughout its length corresponds in curvature to this edge 41.

By referring to the scale 42 carried by the dial or scale face 40, it will be seen that the scale 42 ranges from 0 to 400. This portion of the device is provided with two inwardly extending corrugations opposite the 100 and 300 marks, the intervening valley or depression being opposite the 200 mark. 0 and 400 represent the termini and are also at the bottom of the curve. As a result, the eye can readily see the meniscus 43 within the device and the grooves or corrugations are duplicated in the shape of the meniscus. The point of light 44 representing the interruption of the meniscus by a slot intersecting with the surface of the liquid, is part way down the curve between the crest opposite 100 and the valley which represents 200. Obviously, therefore, this interrupted meniscus is in the neighborhood of 150.

The scale 45 is calibrated between 0 and 100 and it will be noted that crests or corrugations are formed opposite 30, 50 and 70. The interrupted meniscus is indicated at 46 and the eye of the observer readily correlates the position of this interrupted meniscus with the curvature at the edge of the dial face 40 so as to place the same at about 47. Similar corrugations may appear opposite the range 0–10 carried by 47 and by that wall of the device which bears the scale reading from 0 to 1, as at 48. The total reading represented by the device of Fig. 7 is therefore 146½.

A device of substantially hexagonal horizontal section is illustrated in Fig. 8, this form of device being best suited where readings in percentage of total volume are desired. The scale readings carried by the dial face 49 range from zero to one hundred and it will be noted that 0, 20, 40, 60, 80 and 100 are placed at the corners of the hexagon, the other scale markers being the mid points of the interconnecting straight wall portion. The interrupted meniscus shown at 50 in Fig. 8 reads about 56%.

Figure 9:
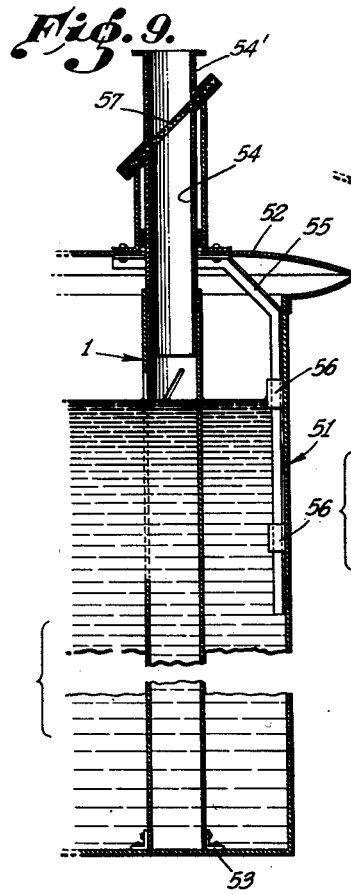
Fig. 9 is a vertical section through a breather-roof tank provided with a gauge of this invention.

The devices herein described may be used in a large number of different ways. Fig. 9 shows a gauging device of this invention installed in a tank 51 provided with a breather-type floating roof 52 capable of moving up and down with the vapor pressure of gases above the level of the liquid contained in the tank. In such installations, the body portion of the device, indicated at 1, may be firmly connected to the bottom of the tank as at 53. A tubular member 54 may be attached to the breather roof 52 in any suitable manner, the lower portion of the tubular member 54 telescopically and slidably fitting the upper end of the gauging device 1. In order to make certain that this upper member 54 moves in a uniform vertical plane, the breather roof 52 may be provided with a downwardly extending guide member 55 slidably fitting into suitable collars 56 attached to the stationary portion of the tank. In order to prevent the escape of vapors through the tubular member 54, a plate of glass or other transparent material 57 may be firmly held within the tube 54, preferably at an angle to the axis of said tube, so as to prevent undesired reflections from interfering with the accuracy of the reading. A gas-tight joint is made between the plate glass 57 and the lower portion of member 54, the upward extension 54' being substantially in alignment with the lower portion so that an observer may look down the tube into the gauging device 1 to take his readings while the fumes or vapors are retained within the tank by the transparent plate 57.

Figure 11:
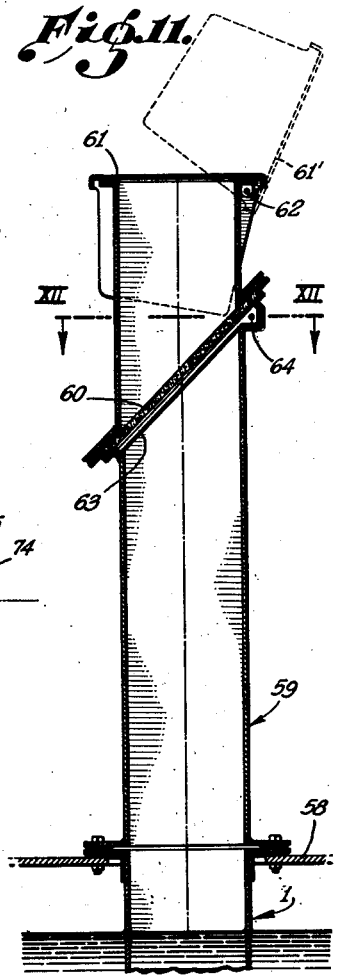
Fig. 11 is an enlarged vertical section through a vapor-tight gauge.

In Fig. 11 the gauging device 1 is shown attached directly to a roof or top 58 of a suitable container, an extension 59 being provided in alignment with the gauge 1, said extension 59 having an inclined transparent plate 60 positioned therein and suitably gasketed. The upper end of the extensions 59 is provided with a cover plate 61 hinged as at 62 so as to permit the end of the extension to be covered when the gauge is not in use. During readings, such hinged cover 61 may be placed into the position indicated by dotted lines at 61'.

In order to prevent condensation of vapors on the lower surface of the plate 60 from interfering with accurate reading of the gauge, means may be provided for cleaning or wiping the lower side of the plate 60. Such means may comprise a wiping element 63 attached to a rod 64 having a suitable knob or handle 65, the rod 64 being slidable through suitable openings in the wall of the extension 59. The wiper 63 is in contact with the lower surface of the plate 60 and reciprocation of the rod 64 will wipe and remove the condensate from the lower surface of the plate 60, thereby clarifying vision of the interrupted meniscus within the gauge 1.

Figure 13:
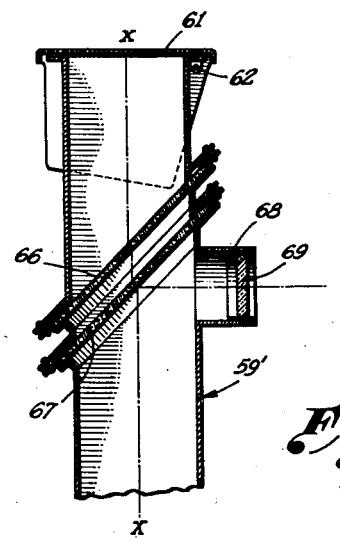
Fig. 13 illustrates a modified form of upper end of a vapor-tight gauge.
Figure 12:
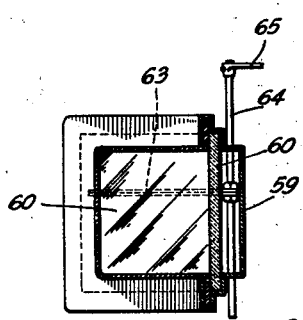
Fig. 12 is a horizontal section taken along the plane XII—XII of Fig. 11.

A still further modification of a substantially gas-tight gauge of this invention is illustrated in Fig. 13 wherein the upper extension 59' of the gauge is provided with a pair of spaced parallel inclined transparent plate members 66 and 67 suitably insulated from each other, gasketed and held within the extension 59'. The space between these two plates 66 and 67 may be exhausted or the air contained in such space may be desiccated so as to prevent condensation on the lower surface of the plates, such desiccated space then acting as an effective insulating means.

Although in the forms of the invention shown in Figs. 9 and 11 the interrupted meniscus becomes visible to the eye of the observer by reason of light being reflected from the interrupted meniscus, the light originally entering the device at the same point at which the observer looks into the device, Fig. 13 distinguishes therefrom in that some additional light is permitted to enter from the side of the extension 59' as, for example, through a side port 68 provided with a transparent gas-tight window 69. This light is reflected downwardly to the surface of the liquid being gauged by the lower side of the plate 67. Such auxiliary light inlet may be used with any of the forms of devices here shown.

In the event the plates 66 and 67 are of considerable thickness, it may be desired to compensate for the refraction of light passing upwardly from the liquid surface to the eye of the observer. The vertical axis $x$–$x$ of the device of Fig. 13 is shown in a shifted position to indicate the refraction and any dials carried by the upper end of the extension 59' are preferably positioned in such manner as to cause the dials to be concentric about the shifted axis after such refraction had taken place.

Figure 10:
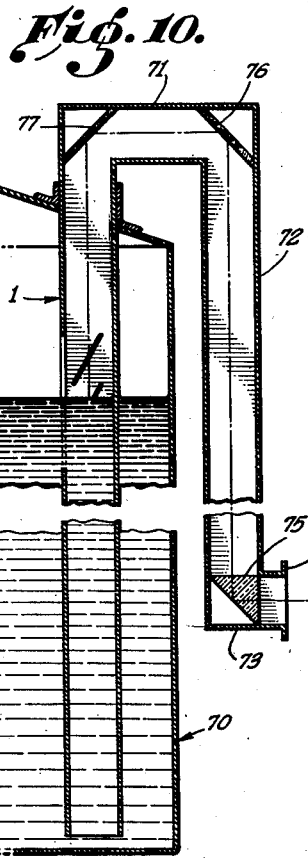
Fig. 10 is a vertical section through a tank provided with a gauge of this invention and with means for reading said gauge from a point below the level of the top of the gauge.

Fig. 10 shows a modification of a gauge embodying the inventions in which the interrupted meniscus is observed from a point below the top of the gauge. The gauge proper is indicated at 1 and is shown in a substantially vertical position within a tank 70. The upper end of the gauge is connected with a horizontally extending portion 71 which in turn is connected to a downwardly extending portion 72 positioned exteriorly of the tank 70, the lower end of the portion 72 having an elbow 73 terminating at a dial face or scale 74. Light is admitted into the gauge through this series of connections and is reflected by means of a prism 75 and 45° mirrors 76 and 77. When a 45° prism is used at 75 the image will be inverted and this should be remembered. The use of refracting members such as 94 (Fig. 14) will overcome this difficulty.

Figure 15:
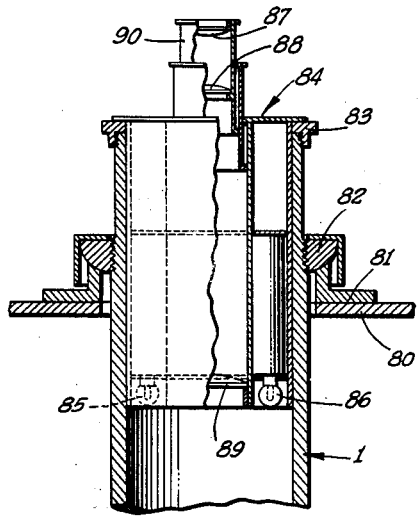
Fig. 15 is a vertical section through the upper end of a gauge, with a telescopic sight and artificial means for illuminating the gauge in position for a reading.

In reading gauges of the character shown in Fig. 10, it may be at times necessary to introduce light from an extraneous source in order to facilitate reading. Fig. 15 discloses a means whereby gauges of extreme length or gauges of the character shown in Fig. 10 may be read with greater facility. As shown in Fig. 15, the gauge 1 is connected to the top of a tank 80. The particular method of connection includes a bearing collar 81 attached to the roof of the tank and having a concave upwardly directed seat adapted to receive a convex longer collar 82 attached to the gauge 1. The upper end of the gauge 1 is provided with the customary dial or scale face 83. In the event the gauge 1 is of extreme length, a telescopic sight, generally indicated at 84, may be slipped into the upper end of the gauge, this telescopic sight carrying self-contained batteries and light sources 85, 86, adapted to throw light downwardly into the gauge 1. Centrally positioned within the telescopic device 84 is a series of lenses 87, 88, 89, etc., some of these lenses being carried by movable mountings as at 90. The telescope referred to may consist of a Ramsden type ocular carrying a suitably graduated scale or indices in the focal plane of the first lens, or it may take the form of a theodolite telescope. A master zero mark is generally indicated on the exterior of the telescope housing so as to permit said zero mark to be set with the zero mark of the customary dial disc or ring 83 so that proper correlation of the permanent dial 83 and of the scale within the telescope can be readily made. The annular arrangement of light sources 85, 86 suitably illuminates the liquid surface within the device 1 and manipulation of the mountings of the telescope permits readings to be taken with great accuracy even though the liquid surface is far removed from the observer.

Devices of the character just described in connection with Fig. 15 may be used to good advantage in devices constructed in accordance with the showings of Fig. 10.

Figure 14:
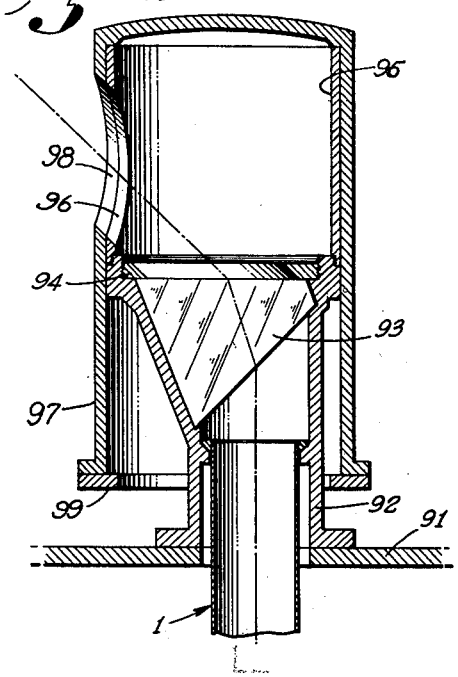
Fig. 14 is a vertical section through the upper end of a gauge provided with a safety head.

A form of safety head for gauges of this invention is indicated in Fig. 14. As there shown, a tank 91 is provided with a head 92 from which is suspended the gauge 1 of this invention. The head 92 contains a prism 93 having a dial face 94 retaining such prism in position. By reason of the refractive characteristics of the prism 93, an observer may look down the gauging device 1 without placing his head directly above the gauge so that in the event of any explosion of contained gases, he is not in direct line of the force of such explosion.

It will be noted that in the form of device shown in Fig. 14, a member 95 is provided above the prism 93, such member having a port 96. Slidably mounted over this member 95 is a cover 97 provided with an inwardly extending flange 99 at its lower end and a port 98 in the upper side wall of the cover 97. The cover 97 may be rotated upon the head 92 into the position indicated in Fig. 14 so that the port 98 is in alignment with the port 96 and the observer may view the gauge in the direction of the dotted lines indicating the path of light. In the event, however, that the prism 93 in head 92 has been destroyed or broken, then the force of the pressure escaping from the tank 91 through the broken prism 93 will cause the cover 97 to slide upwardly until upward movement is stopped by the flange 99 at the bottom of the cover, such flange cooperating with an immovable portion of the head 92. In such upwardly extending position, the port 96 will be covered by the skirt 97 and gas may escape through the port 98. A gauger will immediately observe from the position of the cover on the gauge head that the head has been damaged. Furthermore, if the cover 97 is rotatable as well as longitudinally movable on the head 92 and its upward extension 95, then although the cover and head are in the position shown in Fig. 14 during ordinary readings, such head may be closed by partially rotating the cover 97 so as to seal the port 98 by a portion of the skirt 95 and thereby protect the prism from the weather.

Figure 16:
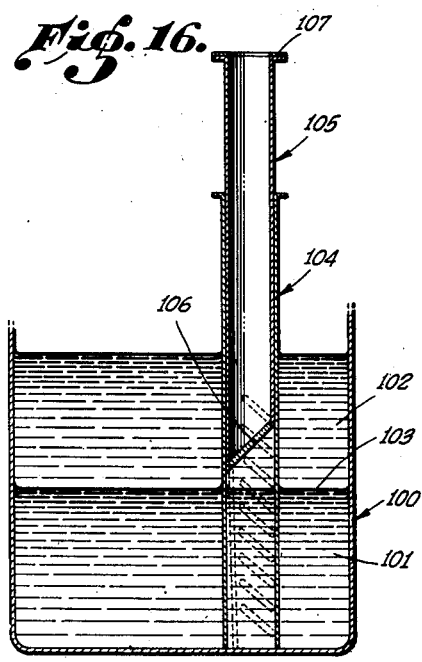
Fig. 16 is a vertical section diagrammatically illustrating an arrangement adapted to permit reading of levels between immiscible liquids.

Fig. 16 illustrates a modified form of gauge in which the position of an interface between two immiscible liquids may be observed. In Fig. 16 the container 100 is shown with a layer of heavier liquid 101 and a supernatant lighter liquid 102, the interface being indicated at 103. The gauge 104 is either suspended or positioned within the container 100 in any suitable manner and includes a telescoping slidable member 105 provided with a closure at its lower end, such closure being indicated by the inclined transparent plate 106. It is to be understood that the walls of the member 105 are imperforate whereas the walls of the gauge 104 are provided with suitable slots adapted to be intersected by the interface level 103. The slidable member 105 may be suitably keyed or oriented with respect to the member 104 and the upper end of the member 105 may carry a suitable scale or dial face 107. By moving the closed end of the member 105 below the upper surface of the supernatant liquid 102, the interrupted meniscus formed by the upper surface of the heavier liquid 101 is illuminated so that the gauger or observer may see through the member 105 the interrupted meniscus at the interface 103 and thereby determine the exact amount of the lower and heavier liquid 101 within the container 100.

Fig. 17 illustrates a common form of installation wherein the gauge of this invention is used both as an inlet and as a measuring device for underground tanks. The ground surface is indicated at 108 and a suitable man-hole, generally indicated at 109, is installed at ground level. A pipe or conduit 110 extends downwardly and is connected to a tank 111 buried in the ground. In the figure the tank 111 is of the horizontal cylindrical type. Suspended into the tank 111 axially with respect to the conduit 110 is the gauge 112. The method of suspension may be similar to that indicated previously in Fig. 15. The bottom end of the gauge 112 is preferably slightly spaced from the bottom of the tank and not attached thereto. The upper end of the conduit 110 may be provided with a removable cap 113. The scale or dial may be carried either by the upper end of the conduit 110 or by the upper end of the gauge 112. The ball suspension is of value in installations of the character shown in Fig. 17 since the gauge 112 will remain plumb even though the tank 111 settles out of level.

It will be noted that in installations of the character shown in Fig. 17, the container 111 may be filled through the conduit 110 and gauge 112 and such conduit 110 and gauge 112 also used for the purpose of measuring the contents of the tank.

Inasmuch as the tank 111 is a horizontally disposed cylinder, equal increments in changes of liquid surface level within the tank will represent different quantities. When, therefore, it is desired that a uniformly graduated direct reading scale be used with a gauge in a tank such as tank 111, it is necessary to change and vary the degree of inclination of the various slots in the gauge. Generally expressed, it may be said that under these conditions a regularly distorted helical slot may be employed wherein the degrees of radial advance per unit of length along its center line are directly proportional to the volumes inside the cylinder and between parallel planes dissecting the cylinder, said planes being spaced in the same manner as the units of length and perpendicular to said helix center line.

By referring to Fig. 18, it will be seen that the abscissa are expressed in terms of volume of an irregular container, such as the horizontal cylinder 111, whereas the ordinates are in terms of depth, such depth being substantially equivalent to the diameter of the tank 111. The variations in volume with uniform changes in depth are indicated by the curve 114 and it will be noted that for a given increment of depth, relatively small changes in volume are indicated at the top of the tank and at the bottom of the tank whereas similar variation in depth produces relatively large changes in volume in the middle portion of the tank. For this reason, the slots employed in a gauge for use in a horizontal cylindrical tank when the gauge is to carry a uniformly graduated volume-reading scale, should be of varying pitch or inclination, such pitch or inclination being substantially a function of the depth-volume relationship of the tank.

When, for example, it is desired that the gauge be provided with a series of tens slots, each covering one-tenth of the total volume within the tank, then the horizontal abscissa identified as the volume abscissa in Fig. 18, may be divided into ten equal parts and each slot formed in the gauge then caused to conform with that portion of the curve 114 which is intercepted by the ordinate. The uppermost slot would therefore conform to the curvature of the section $a$—$b$ of the curve 110. The next slot would conform to the curvature of the section $b$—$c$, etc. By referring to Fig. 17, it will be noted that the inclination of the various slots shown in gauge 112 varies in accordance with curve 114 of Fig. 18.

When it is desired to plan a slot capable of more roughly indicating the contents of tank 111, such slot corresponding to scale C of Fig. 3, then the depth-volume relationship of the tank may be shown by graphs, such as graph 115, and the progressive changes in pitch of such curve employed in laying out a slot for use in the gauge. Those skilled in the art will appreciate that slots may be designed in accordance with the method herein described for any given tank irrespective of shape and size, such slots being capable of cooperating with a uniformly graduated scale or dial from which direct readings in volume may be attained. It will be obvious, however, that any gauge made in accordance with the present invention, even though it has substantially parallel slots, may be used in an irregular tank such as a horizontally disposed cylindrical tank to give actual depth of liquid within the tank, and that such depth may then be converted into volume by reference to a previously prepared graph, such as is shown in Fig. 18.

Fig. 19 illustrates a still further modification of a gauge embodying the inventions herein described. It will be noted that the gauge 120 is positioned within a tank 119 and is supported by an elbow 121 passing through the side of the tank at a point near the bottom thereof. The elbow 121 may be provided with an upwardly extending portion 122. The upper end of the gauge 120 is left open. The lower portion of the gauge may be provided with a prism 123 adapted to reflect light along the elbow 121 toward a reflector 124, which then directs light upwardly through the upstanding leg 122. The prism 123 not only performs the function of reflecting light but also seals the bottom of the gauge 120 so as to prevent escape of liquid from the tank 119 through the upstanding leg 122. In accordance with the arrangement shown in Fig. 19, therefore, the position of the upper surface 125 of the liquid within the tank 119 may be observed from a point well below such liquid surface level.

In view of differences in surface tension of various liquids which may be gauged with devices of this invention and in view of differences in wetting characteristics exhibited by different materials which may be employed in manufacturing the gauge, it is not possible to give specific instructions as to the width of the slots to be formed in the body of the gauge. It is to be remembered, however, that the slot should be of a width sufficient to minimize capillary rise or depression of the liquid in the slot. In all instances the slot should be of a width sufficient to create the desired interruption in the meniscus at the liquid surface, which interruption results in a light-reflecting surface readily visible from the point of observation. Ordinarily, slots on the order of about 1 centimeter in width are sufficient although slots ranging up to about 2 centimeters in width may be employed. When a gauge is of extreme length, it may be desirable to increase the width of the slots in the lower portion of the gauge so as to emphasize the width of the meniscus break and thereby facilitate reading of the gauge at appreciable distances from the point of observation.

Moreover, some liquid surfaces may be more highly reflective than others and the reflection of light from the surface of the liquid within the gauge may interfere with accurate readings of the gauge. In order to obviate this difficulty, means may be provided for masking unnecessary reflection from the surface of the liquid within the gauge. One form of such means is illustrated in Figs. 20 and 21 and may comprise a weighted float 130 capable of floating within the liquid and slightly below the surface thereof. Such float 130 may be provided with a dome or centrally positioned protuberance 131 having a conical or dome-shaped upper surface 132 preferably painted black or other non-actinic color. The dome and the protuberance 131 should extend above the surface of the liquid, thereby interrupting the surface and preventing unnecessary reflections therefrom.

I claim:

1. In a device for accurately determining the surface level of a liquid, the combination of: an elongated member having a slot in the face thereof, said slot being at a predetermined inclination with respect to the level of the liquid, means for passing light longitudinally of said member, and indices associated with one end of said member and correlated to said slot, whereby the lateral position of the point of entry of liquid into the slot may be observed by reflection of light from the surface of the liquid from the meniscus formed in the surface of the liquid at the point of entry into the slot, from a point above the surface of the liquid and in a direction substantially perpendicular to said surface, with respect to the indices to ascertain the surface level of the liquid into which said member is inserted.

2. In a device for accurately determining the surface level of a liquid from a point exteriorly thereof, the combination of: an elongated member having a slot in the face thereof, said slot being at a predetermined inclination with respect to the level of the liquid, and indices carried by one end of said member and correlated to said slot, whereby light reflected by the surface of the liquid at its point of entry into the slot may be observed with respect to the indices to ascertain the surface level of the liquid into which a portion at least of said member is inserted.

3. In a device of the character described, an elongated member provided with indicia at its upper end and a slot in the face of said member, said slot being adapted to assume a predetermined inclination with respect to the surface level of a liquid in a container when said member is inserted into a container, and parallel longitudinally extending guide means carried by the face of the member in line with graduations of said indicia and adapted to intersect said slot whereby the point of entry of liquid into the slot may be observed with respect to the indices at the upper end of the member.

4. In a device for accurately determining the surface level and amount of a liquid in a container from a point exteriorly thereof, the combination of: a stiff elongated member provided with uniformly graduated indicia at its upper end, and a slot in the face of the member, said slot having an inclination to the longitudinal axis of the member varying in accordance with differences in capacity of the container at uniformly spaced levels, and means for passing light longitudinally of said member, whereby when said member is inserted into a container containing a liquid the surface of the liquid is interrupted by the slot and the position of the interruption with respect to the indices is made visually apparent by light reflected from such interruption.

5. In a device for accurately determining the surface level and amount of a liquid in a container from a point exteriorly thereof, the combination of: a stiff, hollow, elongated member adapted to permit light to enter thereinto from the top and provided with uniformly graduated indicia at its upper end, sighting guide means carried by the inner face of the member in line with graduations of said indicia, said member being provided with a slot in the inner face of the member, said slot having an inclination to the longitudinal axis of the member varying in accordance with differences in capacity of the container at uniformly spaced levels.

6. In a device for accurately determining the surface level of a liquid from a point exteriorly thereof, the combination of: a stiff elongated member having a slot in the face thereof, said slot being at a predetermined inclination with respect to the longitudinal axis of the member, said slot being of a width sufficient to minimize capillary rise or depression of the liquid in the slot but not materially wider than two centimeters, and indices carried by the upper end of said member and correlated to said slot, whereby, when said member is partly immersed into a liquid light reflected by the surface of the liquid at its point of entry into the slot may be observed with respect to the indices at the upper end of the member to ascertain the surface level of the liquid.

7. In a device for accurately determining the level and amount of a body of liquid, the combination of: a stiff elongated member having a slot in the face thereof at an angle to the longitudinal axis of the member in a longitudinal area of said member and having a plurality of spaced substantially parallel slots at greater inclination to said axis than said first-mentioned slot, in an adjacent longitudinal area of said member; indicia carried by the end of said member and correlated to said first slot, and additional indicia carried by the end of said member and correlated to the plurality of slots.

8. In a device for accurately determining the level and amount of a body of liquid, the combination of: an elongated member having an inclined slot in the face thereof in a longitudinal area of said member and having a plurality of spaced substantially parallel slots at a greater inclination than said first mentioned slot in an adjacent longitudinal area of said member, the inclination of said plurality of spaced slots being correlated to the inclination of said first mentioned slot; and indicia associated with said member and correlated to said slots whereby, when said member is partly immersed into a liquid, the point of entry of liquid into the slots may be observed with respect to said indicia.

9. In combination with a container for liquids, a device for determining the surface level and amount of liquid in said container comprising: a tubular, hollow, substantially vertical member adapted to permit light to enter thereinto from the top, extending into the container, indicia associated with the upper end of the tubular member, said tubular member being provided with a slot formed in said member and inclined to the longitudinal axis of the member, said slot being correlated to said indicia, whereby the meniscus of the liquid, where it enters the slot, may be visually observed through the top of said member by reflection of light from such meniscus.

10. In a gauging device adapted to be inserted into a container for determining the surface level and amount of liquid therein, the combination of: a hollow member adapted to permit light to enter thereinto from the top, said member being adapted to be introduced in a substantially vertical position into a container, indicia associated with said hollow member, said member being provided with a slot formed in said member and inclined to the longitudinal axis thereof whereby said gauging device may be inserted into a container of liquid and the point of entry of liquid into the slot may be observed with respect to said indicia.

CARY HOLLIS NELSON.